United States Patent
Schlittenbauer et al.

(10) Patent No.: US 11,032,098 B2
(45) Date of Patent: Jun. 8, 2021

(54) CONTROLLER CLUSTER AND METHOD FOR OPERATING THE CONTROLLER CLUSTER

(71) Applicant: Siemens Aktiengesellschaft, Munich (DE)

(72) Inventors: Markus Schlittenbauer, Siegenburg (DE); Hendrik Gerlach, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/668,347

(22) Filed: Oct. 30, 2019

(65) Prior Publication Data
US 2020/0136853 A1   Apr. 30, 2020

(30) Foreign Application Priority Data
Oct. 31, 2018   (EP) .................................. 18203609

(51) Int. Cl.
*G06F 15/16*   (2006.01)
*H04L 12/28*   (2006.01)

(52) U.S. Cl.
CPC ........ *H04L 12/2821* (2013.01); *H04L 12/281* (2013.01); *H04L 12/2832* (2013.01)

(58) Field of Classification Search
CPC .............. H04L 12/2821; H04L 12/281; H04L 12/2832
See application file for complete search history.

(56) References Cited

U.S. PATENT DOCUMENTS

| | | |
|---|---|---|
| 5,148,433 A | 9/1992 | Johnson et al. |
| 6,640,314 B1 | 10/2003 | Lelaure et al. |
| 2007/0128895 A1* | 6/2007 | Kleyer ............... G05B 19/0428 439/76.1 |
| 2007/0176732 A1* | 8/2007 | Humpert .............. G05B 19/058 340/3.44 |
| 2012/0210030 A1 | 8/2012 | Karl et al. |
| 2013/0185726 A1* | 7/2013 | Harms ............... G05B 19/0426 718/102 |

(Continued)

FOREIGN PATENT DOCUMENTS

| | | |
|---|---|---|
| DE | 102009050449 | 12/2010 |
| DE | 102010015455 | 10/2011 |

(Continued)

OTHER PUBLICATIONS

European Search Report based on EP18203609.5 dated May 10, 2019.
Office Action dated Feb. 9, 2021 issued in Japanese Patent Application No. 2019-139894.

*Primary Examiner* — Philip B Tran
(74) *Attorney, Agent, or Firm* — Cozen O'Connor (57) ABSTRACT

A controller cluster for controlling a technical device with a redundant first automation device and second automation device, wherein a virtual network interface controller is arranged in the automation devices between a first network interface controller and a protocol stack, and wherein the network interface controller administers a cluster hardware address in addition to a standard hardware address and thus the controller cluster, despite there being two automation devices, presents itself externally as one device.

19 Claims, 5 Drawing Sheets

(56) References Cited

U.S. PATENT DOCUMENTS

| | | | | |
|---|---|---|---|---|
| 2014/0058533 A1* | 2/2014 | Grosch | ................. | G05B 15/02 |
| | | | | 700/3 |
| 2015/0095690 A1* | 4/2015 | Grosch | ............... | G05B 19/058 |
| | | | | 714/4.11 |
| 2016/0154403 A1 | 6/2016 | Arbogast | | |
| 2016/0308651 A1 | 10/2016 | Pollmann | | |

FOREIGN PATENT DOCUMENTS

| | | |
|---|---|---|
| DE | 102015105929 | 10/2016 |
| EP | 1006423 | 6/2000 |
| EP | 3026513 | 6/2016 |
| JP | 2002-344450 | 11/2002 |
| JP | 2005-136690 | 5/2005 |

* cited by examiner

CONTROLLER CLUSTER AND METHOD FOR OPERATING THE CONTROLLER CLUSTER

BACKGROUND OF THE INVENTION

1. Field of the Invention

The invention relates to redundant automation systems and, more particularly, to a controller cluster for controlling a technical device comprising a bus system, a first automation device and a second automation device, where the first automation device has a first control program and the second automation device has a second control program for controlling the technical device, where the first and the second control program are established such that they each perform the same control tasks for the technical device, and where the first automation device has a first network interface controller with a first standard hardware address, which is connected to the bus system and the second automation device has a second network interface controller with a second standard hardware address, which is connected to the bus system.

2. Description of the Related Art

A controller cluster can be considered as a redundant automation system, for example, which is also referred to as an H system (high-availability system). An H system is a failsafe automation system, which generally has two coupled automation devices, in particular programmable logic controllers, which jointly control a technical device. In such cases, precisely one automation device takes the lead in the control of the technical device at any one time. In each case, the lead automation device is referred to as the main automation device or master. The other automation device, in each case, is always ready to assume control of the technical device. The other automation device is also referred to as the standby automation device or reserve. Should one of the two automation devices fail, it is possible for the technical process to be controlled by the other automation device in each case, which is also referred to as high-availability. Each automation device in an H system has its own interface, such as an Ethernet interface, with its own IP address for communication on a bus system, i.e., a field bus.

An H system with a first automation controller and a second automation controller is also disclosed in DE 10 2009 050 449 B3.

U.S. Pat. No. 5,148,433 A likewise discloses an H system, where both controllers have the same address.

As a rule, many users exist in an automation system, who must connect to the redundant automation system in order to deliver or retrieve process data or to display or process this data. A majority of the users in the group of said users have knowledge about the existence of a redundant automation system (2-CPU system).

In conventional H systems, it is a disadvantage that it is not clear to users who have to establish a connection to an H system which remote IP address the H system possesses. The H system either has a first address for the first automation device or a second address for the second automation device. If one of the two addresses is used and it is precisely the automation device with the address used that fails, then the user can no longer set up the connection even though the H system as a whole is still available.

Previously, the problem has been resolved by only functionally-expanded users (clients, HMIs) existing that have a further IP address configured. If the connection to the first address fails and can no longer be set up, then they work with a second IP address. The disadvantage of this solution is that a special implementation for address management is necessary in the users.

European patent EP 3 026 513 B1 proposes a solution, where there is a reference data interface, to which a reference address is assigned, connected upstream from the redundant automation system. In this case, the reference data interface is configured to manage a first connection path between the H system and a second connection path between the H system.

SUMMARY OF THE INVENTION

It is an object of the present invention to provide a high-availability controller or a high-availability controller system, which can be considered by the customer from their standpoint as a black box and is also to be addressed as such in the network. A user should not have to know which device of the redundant controller is currently active (master). For the user, it would be of great advantage to be able to access everything via just one address.

These and other objects and advantages are achieved in accordance with the invention by a controller cluster with the first automation device and the second automation device, wherein a first virtual network interface controller is arranged between a first network interface controller and a first protocol stack of the first automation device and a second virtual network interface controller is arranged between the second network interface controller and a second protocol stack of the second automation device, where furthermore both the first and also the second network interface controller are additionally configured to manage a cluster hardware address, and where the first protocol stack can be accessed via the first standard hardware address and the first protocol stack can only be accessed via the first virtual network interface controller via the cluster hardware address when the controller is switched to active and the second protocol stack can be accessed via the second standard hardware address and the second protocol stack can only be accessed via the second virtual network interface controller via the cluster hardware address when the controller is switched to active.

Preferably, a first redundancy manager is present in the first automation device and a second redundancy manager is present in the second automation device, where the two redundancy managers are connected to one another via a synchronization connection and are configured to switch the first virtual network interface controller to active and the second virtual network interface controller to inactive or switch the first virtual network interface controller to inactive and the second virtual network interface controller to active.

Advantageously, the controller cluster is now accessible to external users via just one address, namely via the cluster hardware address or via the cluster IP address assigned to it. The inventive system is not restricted to two automation devices. A controller cluster can also consist of n automation devices, where only one automation device is ever active. The virtual network interface controllers of the automation devices belonging to a common cluster are then preferably logically connected to one another. Only precisely one of all virtual network interface controllers connected in this way is active, all others are inactive. With a failover, the active virtual network interface controller is switched to inactive or fails, and one of the other logically-coupled virtual network interface controllers assumes the active role. Failover in the sense of the invention means a switch, unplanned in the case of an error, e.g., a failure on one side, or also planned in the case of a desired switchover, between two or more automation devices. As a result thereof, the services can be kept highly available despite the failure of one of the systems.

All logically-coupled virtual network interface controllers are allocated a shared MAC address, namely the cluster hardware address. Preferably, the virtual network interface controllers parameterize this MAC address as an additional MAC address in a hardware filter of the subordinate first or second network interface controller. It is of advantage here for the now subordinate network interface controller not to have to be operated in a so-called promiscuous mode, which would involve a filtering of the MAC address in the software, where this filtering in software would again affect the performance of the device, in particular on small devices this should not be done on account of a high receive load to be expected.

Preferably, the two redundancy managers are configured to perform a supervision of functions on their automation devices or on functions executing therein and, in the event of a detected malfunction, to switch the respective active virtual network interface controller to inactive and to switch the corresponding inactive virtual network interface controller to active. The redundancy manager typically supervises the local functions and in particular the functions of the other automation devices belonging to the cluster. In such cases it typically synchronizes via a communication channel with the other redundancy managers of the other automation devices of the cluster. In the event of an error (failure of the current master), the redundancy managers of the cluster initiate a failover. The aim in this case is to ensure that there is always only precisely one master in the controller cluster at a dedicated point in time.

The communication channel can also be established redundantly in physical terms, in order to increase the robustness of the controller cluster in relation to individual errors.

In a further embodiment, it is advantageous for the synchronization connection to be embodied as a communication channel with Layer-2 Ethernet frames. Accordingly, the redundancy manager, in one embodiment, can set up a communication channel via the existing bus system via Layer-2 Ethernet frames. In a specific embodiment for this purpose, MAC addresses are used that are not forwarded by normal Institute of Electrical and Electronics Engineers (IEEE) 802.1D-conformant bridges. In a further embodiment, it is conceivable for the communication channel not only to be used for coordination of the failover between the redundancy managers, but also to be used simultaneously for transmission of synchronization data for synchronization of the data and statuses of the services and applications of the controller cluster involved.

The synchronization connection could also be performed via a dedicated line, in particular a redundantly-configured line.

It is furthermore advantageous for the protocol stack to have a standard interface for data traffic from standard applications and a cluster interface for data traffic from cluster applications. In such cases, standard services of standard applications are to be understood in the sense of the invention as automation technology services such as are used by an engineering system. These services make it possible to access any given automation device. Standard services also include diagnosis and energy management functions as well as firmware updates and other uploads to the automation devices. Cluster services of cluster applications are internal data services of the controller cluster and these can be used from outside the controller cluster, e.g., for access by a client to the controller cluster. Accordingly, it is advantageous to also use the communication channel or the synchronization connection for synchronization of the data and statuses of the cluster services or their cluster applications and/or for transmission of signals to timing controllers for synchronizing the cycles of the processing of the respective control programs.

In a further embodiment, the protocol stacks have a routing manager, which is configured to route data traffic from standard applications via the standard interface and to route data traffic from cluster applications via the cluster interface. In this case, the routing manager of the respective protocol stack is configured such that, for example, outgoing data traffic from cluster applications or cluster services and outgoing data traffic from standard applications or standard services must be routed via the corresponding IP interface or the corresponding standard interface or corresponding cluster interface. It is thereby insured that the data traffic generated by cluster applications is not used in the virtual network interface controller of the reserve device.

It is furthermore advantageous for the management of data between the services when the protocol stacks have a cluster services programming interface and a standard services programming interface.

It is advantageous in the sense of automation technology for the controller cluster to be established as a high-availability, redundant automation system for automation applications, in which the availability of an automation device is of the highest priority, and is established to be shown as a single system when accessed by a client. The high availability can also be seen for the opposite direction, i.e., an access from outside to services of the controller cluster. The controller cluster can also have services that occur as a client. Such cluster services can access server cluster services, which lie on other clusters or also access data, which lies in high-availability storage systems, as a client.

It is also an object of the invention to provide a method for operating a controller cluster. In the method for operating a controller cluster for controlling a technical device, where a first automation device and a second automation device are operated redundantly on a bus system, on the first automation device a first control program and on the second automation device a second control program for controlling the technical device are executed, where the first and the second control program are established such that they each perform the same control tasks for the technical device, and where the first automation device is operated via a first network interface controller with a first standard hardware address on the bus system and the second automation device via a second network interface controller with a second standard hardware address on the bus system. It is a characteristic for the method that a first virtual network interface controller is operated between the first network interface controller and a first protocol stack of the first automation device and that a second virtual network interface controller is operated between the second network interface controller and a second protocol stack of the second automation device, where furthermore both the first and also the second network interface controller are additionally operated with a cluster hardware address, and where the first protocol stack is accessed via the first standard hardware address and the first protocol stack can only be accessed via the first virtual network interface controller via the cluster hardware address when the controller is switched to active and the second protocol stack is accessed via the second standard hardware address and the second protocol stack can only be accessed via the second virtual network interface controller via the cluster hardware address when the controller is switched to active.

Advantageously, a first redundancy manager is operated in the first automation device and a second redundancy manager is operated in the second automation device, where the two redundancy managers are connected to one another via a synchronization connection and are configured to switch the first virtual network interface controller to active and the second virtual network interface controller to inactive or switch the first virtual network interface controller to inactive and the second virtual network interface controller to active.

Preferably, the virtual network interface controllers parameterize the cluster hardware address as an additional MAC address in a hardware filter of the subordinate first network interface controller and of the second network interface controller. The advantage of this is that the subordinate network interface controllers do not have to be operated in a so-called promiscuous mode, because with a software solution this needs too much device performance, which comes at the expense of fast communication and/or can be disadvantageous for performance during the processing of the control tasks (i.e., the CPU power is lost for the control tasks, which should actually be the main task of a PLC).

Advantageously, the two redundancy managers perform a function supervision on their automation devices or on functions running therein and, when a malfunction is detected at an automation device with the active virtual network interface controller, they switch this to inactive and they switch the corresponding inactive virtual network interface controller of the other automation device to inactive.

In accordance with the method, it is advantageous to operate the synchronization connection as a communication channel with Layer-2 Ethernet frames and to set up this communication channel via the bus system and the network interface controllers.

In accordance with the method, and in particular for an implementation of the method in software within the protocol stack, it is advantageous to operate the protocol stacks each with a standard interface for data traffic from standard applications and with a cluster interface for data traffic from cluster applications. In such cases outgoing data traffic will accordingly be routed via the corresponding interfaces, where depending on the status of the virtual network interface controller, data traffic from cluster applications will either be blocked or forwarded, data traffic from standard applications can always be sent independently thereof, and in addition there is the appropriate application of the corresponding standard hardware address. The appropriate standard IP sender address is also entered if the packet to be sent involves an IP packet.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows an exemplary embodiment of a controller cluster with at least two automation devices, in which.

DETAILED DESCRIPTION OF THE EXEMPLARY EMBODIMENTS

Figure 1:
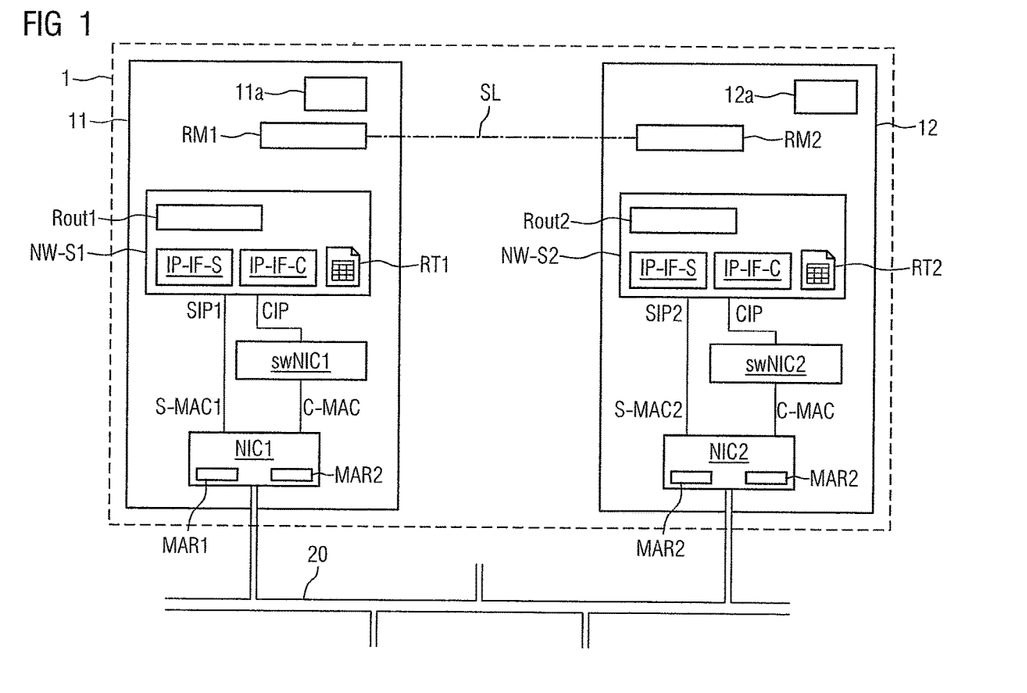
FIG. 1 shows a controller cluster in a simplified diagram to demonstrate the issuing of addresses in accordance with the invention.

In accordance with FIG. 1, a controller cluster 1 for controlling a technical device is shown. The controller cluster 1 comprises a bus system 20, a first automation device 11 and a second automation device 12, where the first automation device 11 has a first control program 11a and the second automation device 12 has a second control program 12a for controlling the technical device. The first and the second control program 11a, 12a are established such that they each perform the same control tasks for the technical device. The first automation device 11 has a first network interface controller NIC1 with a first standard hardware address S-MAC1. The first network interface controller NIC1 is physically linked to the bus system 20.

A first virtual network interface controller swNIC1 is arranged between the first network interface controller NIC1 and a first protocol stack NW-S1 of the first automation device 11. There is an identical arrangement for the second automation device 12 and a second virtual network interface controller swNIC2 is in fact arranged between a second network interface controller NIC2 and a second protocol stack NW-S2. The network interface controllers NIC1 and NIC2 are now configured such that they each have a first MAC address register MAR1 and a second MAC address register MAR2. Accordingly, the first network interface controller NIC1 can manage a first standard hardware address S-MAC1 and a second cluster hardware address C-MAC. Likewise, the second network interface controller NIC2 can manage a second standard hardware address S-MAC2 and the cluster hardware address C-MAC in its registers MAR1, MAR2.

The first protocol stack NW-S1 can be accessed via the first standard hardware address S-MAC1 and the first protocol stack NW-S1 can only be accessed via the first virtual network interface controller swNIC1 via the cluster hardware address C-MAC when the controller is switched to active. Accordingly, the second protocol stack NW-S2 can be accessed via the second standard hardware address S-MAC 2 and the second protocol stack NW-S2 can only be accessed via the second virtual network interface controller swNIC2 via the cluster hardware address C-MAC when the controller is switched to active.

To switch the virtual network interface controllers swNIC1, swNIC2 to active and inactive, a first redundancy manager RM1 and a second redundancy manager RM2 is arranged in each automation device 11, 12, respectively. The two redundancy managers RM1, RM2 are connected to each other via a synchronization connection SL and are configured to switch the first virtual network interface controller swNIC1 to active and to switch the second virtual network interface controller swNIC2 to inactive or switch the first virtual network interface controller swNIC1 to inactive and to switch the second virtual network interface controller swNIC2 to active.

Along with the allocation of the standard hardware addresses and of the cluster hardware addresses, the virtual network interface controllers swNIC1, swNIC 2 are likewise allocated a cluster IP address CIP and of course the standard applications SA are allocated a first standard IP address SIP1 and a second standard IP address SIP2. Layer-2 applications and corresponding IP applications then always use the cluster hardware address C-MAC and the cluster IP address CIP for addressing the controller cluster 1 or the standard applications SA and cluster applications VA executing therein (see FIG. 2). This has the advantage that, with a hot standby switchover of the two addresses (MAC and IP), a MAC-IP assignment is retained. Advantageously, ARP caches of IP clients do not have to be updated accordingly. IP communication can also continue immediately, even after a failover FO. The failover FO is not noticed with respect to communication from connected clients (HMI)(see FIG. 2).

The virtual network interface controllers swNIC1, swNIC2 are controlled by the associated redundancy managers RM1, RM2. The redundancy managers RM1, RM2 in the controller cluster decide which automation device 11, 12 is the currently active device (master) and which device, until a failover, i.e., the failure of the master, is the inactive device (backup). The redundancy manager RM1, RM2 of an automation device 11, 12 controls the statuses of the virtual network interface controllers swNIC1, swNIC2 accordingly (active/inactive). The redundancy managers RM1,RM2 can communicate via a dedicated (see FIG. 2) sync line DSL or also as Layer-2 communication via the bus system 20.

The respective protocol stacks NW-S1 and NW-S2 each have a first routing manager Rout1 and a second routing manager Rout2. The routing managers Rout1, Rout2 accordingly form the routing part of the first protocol stack NW-S1 and second protocol stack NW-S2. They make sure that outgoing data traffic from cluster applications VA and outgoing data traffic from standard applications SA must be routed via a corresponding IP interface. To this end, the protocol stacks NW-S1, NW-S2 each have a standard interface IP-IF-S and a cluster interface IP-IF-C. The data traffic, i.e., the IP traffic from standard applications SA, is to be routed via the standard interface IP-IF-S and the data traffic from the cluster applications VA is to be routed via the cluster interface IP-IF-C. If the "correct" interface is selected, the outgoing data traffic flows via the corresponding network interface controller NIC1, NIC2 or the corresponding virtual network interface controller swNIC1, swNIC2. This ensures that data traffic from cluster applications VA, depending on the status of the virtual network interface controller swNIC1, swNIC2, will be blocked or forwarded and data traffic from standard applications SA can always be sent independently thereof. In addition, there is an appropriate application of a sender MAC address with this. If required the appropriate IP sender address is also allocated with this method. The IP address is still assigned in the protocol stack NW-S1, NW-S2 and at the latest on exit from one of the interfaces.

The routing managers Rout1, Rout2 each use a routing table RT1, RT2 for assistance. A standard IP stack can no longer decide on its own in the previously described inventive construction based on its routing tables as to which IP interface, standard interface IP-IF-S or cluster interface IP-IF-C, is to be used for the IP traffic to be sent. IP routing, meaning the selection of the send interface to be used here (standard interface, cluster interface) is done in standard IP stacks solely on the basis of the destination IP address. The interface to be used in this case is established on the basis of the routing table. Here, the IP subnet of an IP interface plays a decisive role. The presence of two equal-value sender interfaces, as seen by the IP stack, (equal-value, because they are located in the same IP subnet) means that an ambiguity exists in the selection of the sender interface and thus also of the sender IP address.

This ambiguity is resolved by the respective routing manager Rout1, Rout2. The routing manager Rout1, Rout2 is a small software expansion in the IP stack or in the first protocol stack NW-S1 and in the second protocol stack NW-S2 and ensures IP packets from cluster applications VA will be sent via the cluster interface IP-IF-C, which is assigned to the respective virtual network interface controller swNIC1, swNIC2, and all other IP packets, i.e., those from standard applications SA, go via the usual path via the standard interface IP-IF-S and thus directly via the first network interface controller NIC1 or the second network interface controller NIC2.

In relation to data packets to be received, the routing manager Rout1, Rout2 forms information about the path via which the receive packets have arrived, i.e., whether they been received via a cluster path or a cluster application VA, i.e., via the virtual network interface controller NIC1, NIC2. This information is made available to a cluster services programming interface C-API1, C-API2 and can be used by the cluster applications VA.

Figure 2:
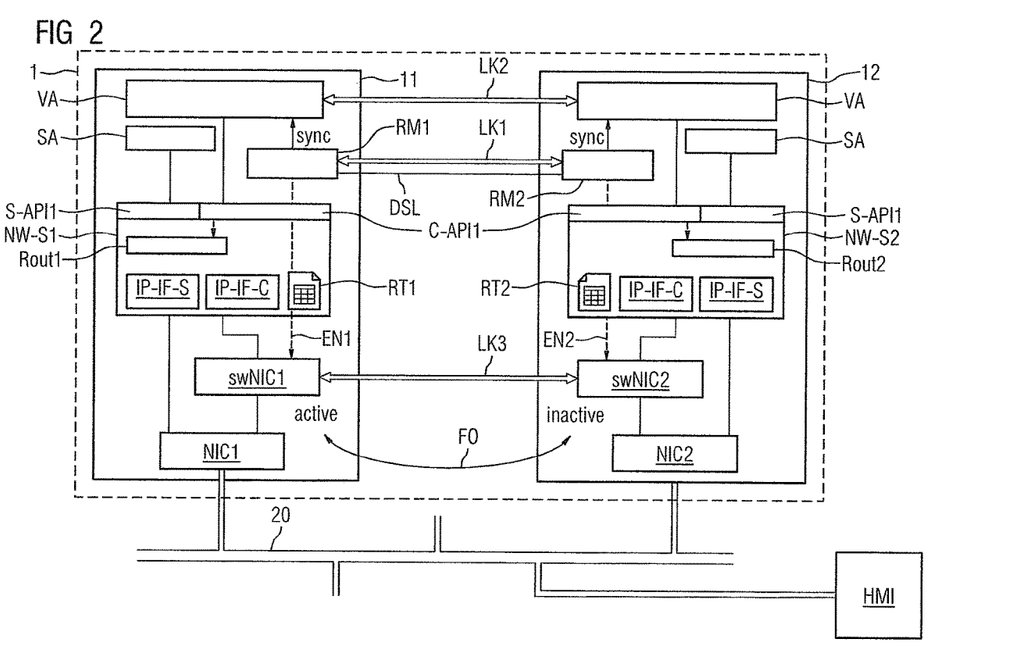
FIG. 2 shows the controller cluster depicted in FIG. 1 in a more detailed diagram with coupling paths and applications.

In accordance with FIG. 2 the controller cluster 1 depicted in FIG. 1 is shown in somewhat greater detail and to some extent the functionalities and the means that are depicted in FIG. 2 have already been discussed with the description of FIG. 1. The protocol stacks NW-S1, NW-S2 have the aforementioned cluster services programming interfaces C-API1, C-API2 and each have a standard services programming interface S-API1, S-API2. The cluster applications VA can be accessed via the cluster services programming interfaces C-API1, C-API2 and the standard applications SA can be accessed via the standard services programming interfaces S-API1, S-API2. The virtual network interface controllers swNIC1, swNIC2 typically do not know the subordinate hardware of the network interface controllers NIC1, NIC2. Unlike the drivers for real network interface controllers, they are not completely hardware-specific. However, specific hardware characteristics are necessary in the subordinate network interface controller. This includes in particular the support of a second unicast MAC address in the subordinate network interface controller hardware. Accordingly, the virtual network interface controllers swNIC1, swNIC2 are located above the network interface controllers NIC1, NIC2 of the high-availability automation devices 11, 12. In such cases, on each automation device 11, 12 all or also only some of the real network interfaces can be involved. That is, on a multi-home automation device (automation device with a number of network ports), for example, all or also only a part of the real network interfaces can be equipped with the additional cluster functionalities.

In accordance with FIG. 2, the two automation devices 11, 12 in a controller cluster 1 are shown and this cluster can be accessed via one address. The virtual network interface controllers swNIC1, swNIC2, in an active state, forward the data traffic from other cluster applications VA via the protocol stacks NW-S1,NW-S2 to their own cluster applications VA. Conversely, the data traffic coming via the protocol stack NW-S1,NW-S2 of the own cluster applications VA is sent via the virtual network interface controllers swNIC1, swNIC2 and the subordinate real network interface controllers NIC1, NIC2 to the bus system 20 for other cluster applications VA. Broadcasts and Multicasts are handled appropriately, i.e., duplicated on the input side, for example, if necessary (so that these can be received via the normal network interface controller NIC1, NIC2 for the protocol stack NW-S1, NW-S2 (entering there via the standard interface IP-IF-S) and also via the cluster data traffic path (namely, via the virtual network interface controller swNIC1, swNIC2), if the corresponding applications use a separate network API.

In the "inactive" state of the virtual network interface controller swNIC1, swNIC2, no data traffic is forwarded. Received data packets at the cluster hardware address C-MAC or cluster IP address CIP are discarded without any further reaction (likewise broadcast, or multicast). Data packets sent from the cluster application VA are likewise discarded without being replaced. Here, a suitable error code can be returned to the cluster applications. This can inform the cluster applications that a "parallel" cluster application VA has the lead role on the active automation device 11,12 in the controller cluster 1 (master).

A further task of the virtual network interface controllers swNIC1, swNIC2 consists of impressing the cluster hardware address C-MAC as sender address on the frames to be sent, while sent frames of standard communication are sent via the normal network interface controller NIC1, NIC2 with the standard hardware address S-MAC as sender address.

The cluster services programming interface C-API1, C-API2 forms the interface for the cluster expansions in the network to the applications. This interface comprises both data plane/data path and also the control plane (i.e., in particular the management path). This cluster services programming interface C-API1, C-API2 not only possesses a pure API functionality, but also functional characteristics for the routing managers Rout1, Rout2.

A data plane portion of the cluster services programming interface C-API1, C-API2 is used by the cluster applications VA to provide network-capable cluster services VD. Here, the cluster services programming interface C-API1, C-API2 cooperates closely with the routing managers Rout1, Rout2. With the use of the cluster services programming interface C-API1, C-API2 by the cluster applications VA, the routing manager Rout1, Rout2 is informed that all data traffic generated by these applications involves cluster data traffic, which is to be handled via the virtual network interface controller swNIC1, swNIC2 and thus via the cluster IP address. Applications that do not use the cluster services programming interface C-API1, CAPI2, but instead use the standard services programming interface S-API1, S-API2 of the protocol stack NW-S1, NW-S2 are sent as usual via the (standard) network interface controller NIC1, NIC2 and thus via the primary IP addresses assigned thereto.

In the receive direction, the cluster services programming interface C-API, C-API2 signals to the cluster applications VA that the protocol stack NW-S1,NW-S2 has received data packets via the cluster hardware address C-MAC1 or via the cluster IP address CIP. That is, a cluster service VD or a cluster application VA has been accessed and not a standard application SA. This differentiation is in particular significant if cluster applications VA and standard applications SA occupy the same UTP or TCP port for example, such as web server as cluster service or web server as standard service parallel on port 80, but with different tasks. Then, only the IP address defines the service that has accessed the same device. A control plane part of the cluster services programming interface C-API1, C-API2 is used by the redundancy managers RM1, RM2. Moreover it controls the statuses (active/inactive) of the respective virtual network interface controller swNIC1, swNIC2; via a first enable line EN1 or a second enable line EN2, the respective redundancy manager RM1,RM2 can allocate to the first or second virtual network interface controller swNIC1, swNIC2 the status of active/inactive via the respective protocol stack NW-S1, NW-S2.

The redundancy managers RM1, RM2 are coupled via a first logical coupling LK1, the cluster applications VA are coupled via a second logical coupling LK2, and the virtual network interface controllers swNIC1, swNIC2 are coupled via a third logical coupling LK3. As already mentioned, a dedicated sync line DSL can be present between the two redundancy managers RM1, RM2 in addition to the first logical coupling LK1.

Further explanations about the logical couplings LK1, LK2, LK3:

The first logical coupling LK1: the statuses of the cluster applications VA are synchronized. This must be so because otherwise they cannot continue to operate collision-free after a switchover.

Each logical cluster service VD is provided on the two automation devices in a cluster application VA. These have internal statuses, which are to be synchronized, so that from the outside (black box view) they appear as a single cluster service. A failover FO will accordingly have no effect, i.e., there are no resulting jumps or losses of status.

The second logical coupling LK2: what is meant here is the synchronization and the exchange of data between the redundancy managers RM1, RM2. The redundancy managers RM1, RM2 will as a rule, also perform the synchronization of the statuses of the cluster applications VA.

The third logical coupling LK3: this is for only one of the two virtual network controllers swNIC1, swNIC2 ever being active. This too is arranged by the redundancy managers RM1, RM2.

The dedicated sync line DSL is a physical medium for synchronization and the exchange of data between the redundancy managers RM1, RM2. Thus, the dedicated sync line DSL is the basis for the logical couplings, which are ultimately realized using it. Another embodiment would be an embodiment where there is no dedicated DSL but this communication channel exists between the redundancy managers RM1, RM2 via the bus system 20, but with disadvantages for the load from the bus.

The switchover from the first automation device 11 to the second automation device 12 occurs through a failover process FO, the client HMI connected via the bus system 20 to the controller cluster 1 sees the controller cluster 1 as a black box and can always address it with the same address.

Figure 3:
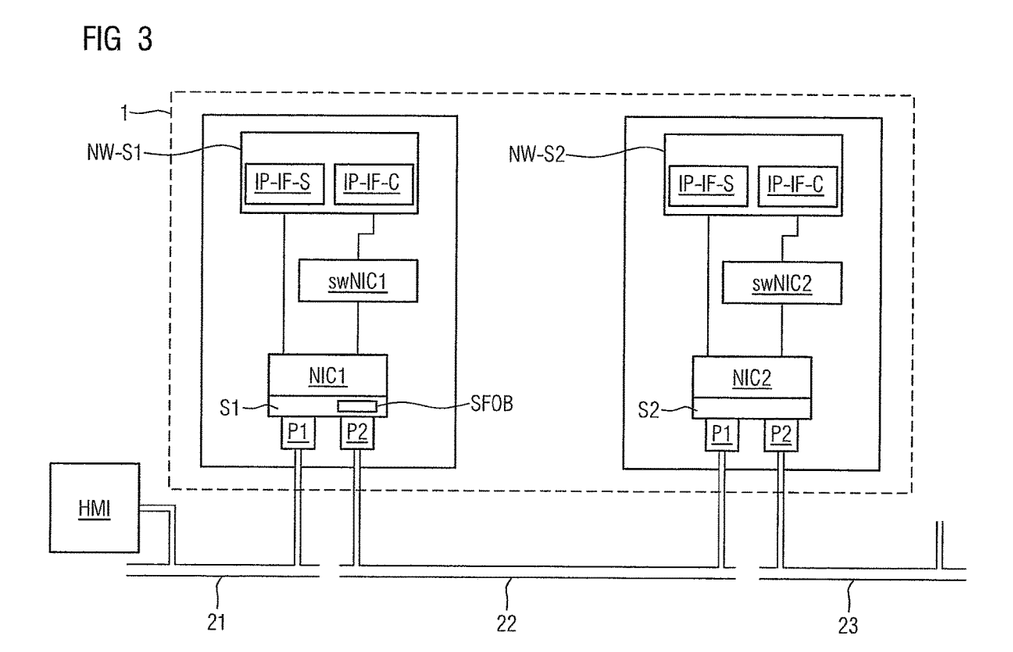
FIG. 3 shows a special case in which the bus system is subdivided into different segments in accordance with the invention.

Shown with FIG. 3 is a line structure of a bus system 20. Here, the bus system 20 comprises a subordinate field bus as line structure, wherein a first bus segment 21, a second bus segment 22 and a third bus segment 23 are present. Here, the corresponding network port of an automation device 11, 12 is not formed as an individual port, but the network port possesses an integrated Layer-2 switch, and the switch typically has a first port P1 and a second port P2. With respect to the redundant communication device already described on the redundant automation devices, the problem that emerges here is that a client HMI, which is connected to a part of the controller cluster 1, which through a failover FO has become a backup from a master, can no longer communicate with a master lying behind it in the line. This is caused by the first switch S1 having recognized/learned that for the divided MAC address 08-00-06-FF-01-01 there is a local consumer (left-hand part device in the figure). MAC addresses in an Ethernet broadcast domain are normally unique. Consequently, Layer-2 frames to this address will not be forwarded to the other second port P2 and can thus not reach the current master (right-hand part device in the figure). This state is maintained until the learning entry (Layer-2 forwarding database FDB) in the first switch S1 has timed out, this typically lies in the range of minutes.

In order to prevent these situations, a switch FDB in the inventive controller cluster 1 is influenced so that the MAC address that is used in the system as cluster hardware address is forwarded both to the local consumer and also in addition to the other switch ports S2 (P1, P2) beyond which the other part device of the cluster is located.

Figure 4:
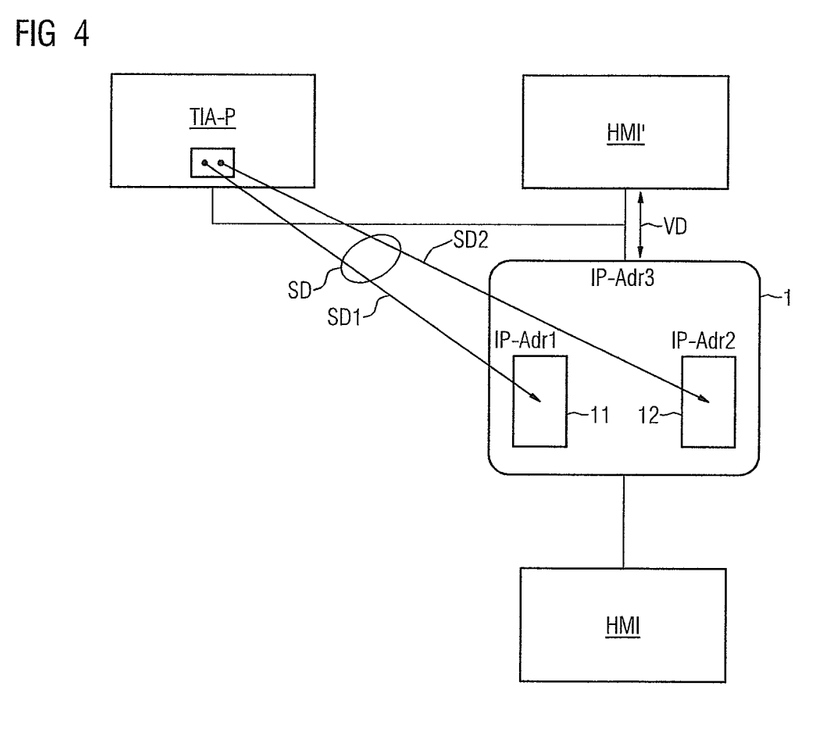
FIG. 4 shows a summary block diagram to show a common IP address for a black box view in accordance with the invention.

With FIG. 4, the principle is shown once again in summary. The controller cluster 1 represents a system driver, a user or a client HMI or HMI' as a black box. In this black box, there exists a first automation device 11 with a first IP address 1 and a second automation device 12 with a second IP address 2. The clients HMI, HMI' can communicate with the black box via cluster services VD and via a third IP address. They have no knowledge that two automation devices 11, 12 are running within the black box, they only ever see one, addressable via a third IP address 3.

An engineering system TIA-P can address the first automation device 11 and the second automation device 12 via standard services SD. The first automation device 11 can be accessed explicitly by a first standard service SD1 and the second automation device 12 can be accessed explicitly by a second standard service SD2. The clients HMI, HMI' can address the entire controller cluster 1 via cluster services VD. The clients HMI, HMI' only ever see one device and, in the event of a failover FO, do not realize at all that another controller is now responsible for them.

Figure 5:
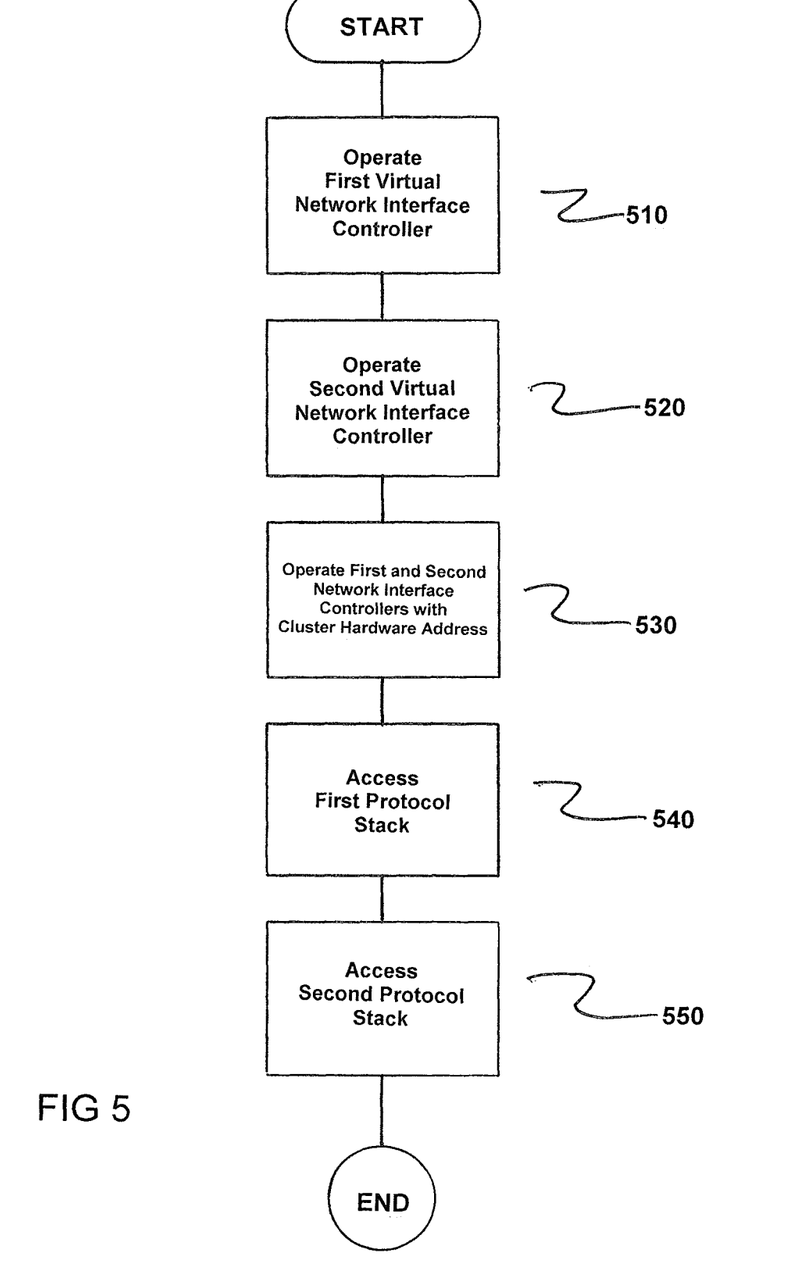
FIG. 5 is a flowchart of the method in accordance with the invention.

FIG. 5 is a flowchart of the method for operating a controller cluster 1 for controlling a technical device, where a first automation device 11 and a second automation device 12 is operated redundantly on a bus system 20, a first control program 11a executes on the first automation device 11 and a second control program 12a executes on the second automation device 12 to control thee technical device, the first and the second control programs 11a, 12a are formed such that the first and second control programs 11a, 12a each perform the same control tasks for the technical device, and where the first automation device 11 is operated via a first network interface controller NIC1 with a first standard hardware address S-MAC1 on the bus system 20 and the second automation device 12 is operated via a second network interface controller NIC2 with a second standard hardware address S-MAC2 on the bus system 20. The method comprises operating a first virtual network interface controller swNIC1 between the first network interface controller NIC1 and a first protocol stack NW-S1 of the first automation device 11, as indicated in step 510.

Next, a second virtual network interface controller swNIC2 is operated between the second network interface controller NIC2 and a second protocol stack NW-S2 of the second automation device 12, as indicated in step 520.

Next, the first and second network interface controller NIC1, NIC2 is operated with a cluster hardware address C-MAC on the bus system 20, as indicated in step 530.

Next, the first protocol stack NW-S1 is accessed via the first standard hardware address S-MAC1, as indicated in step 540. Here, the first protocol stack NW-S1 is only accessible via the first virtual network interface controller swNIC1 via the cluster hardware address C-MAC when said controller is switched to active.

Next, the second protocol stack NW-S2 is accessed via the second standard hardware address S-MAC2, as indicated in step 550. Here, the second protocol stack NW-S2 is only accessible via the second virtual network interface controller swNIC2 via the cluster hardware address C-MAC when said controller is switched to active.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A controller cluster for controlling a technical device, comprising:
 a bus system;
 a first automation device including a first control program for controlling the technical device and a first network interface controller with a first standard hardware address, which is connected to the bus system;
 a second automation device including a second control program for controlling the technical device and a second network interface controller with a second standard hardware address, which is connected to the bus system, the first and the second control programs being formed such that said first and second controls programs implement the same control tasks for the technical device;
 a first virtual network interface controller arranged between the first network interface controller and a first protocol stack of the first automation device; and
 a second virtual network interface controller arranged between the second network interface controller and a second protocol stack of the second automation device, the first and second network interface controllers being configured to administer a cluster hardware address;
 wherein the first protocol stack is accessible via the first standard hardware address and the first protocol stack is only accessible via the first virtual network interface controller via the cluster hardware address when said controller is switched to active and the second protocol stack is accessible via the second standard hardware address and the second protocol stack is only accessible via the second virtual network interface controller via the cluster hardware address when said controller is switched to active.

2. The controller cluster as claimed in claim 1, further comprising:
a first redundancy manager within the first automation device and a second redundancy manager within the second automation device;
wherein the first and second redundancy managers are interconnected via a synchronization connection and are configured to switch the first virtual network interface controller to active and to switch the second virtual network interface controller to inactive or switch the second virtual network interface controller to active and to switch the first virtual network interface controller to inactive.

3. The controller cluster as claimed in claim 2, wherein the first and second redundancy managers are configured to perform supervision of the functions on their respective automation devices or on the functions executing therein and, when a malfunction is recognized, configured to switch a respective active virtual network interface controller to inactive and to switch a corresponding inactive virtual network interface controller to active.

4. The controller cluster as claimed in claim 3, wherein the synchronization connection is configured as a dedicated redundant line.

5. The controller cluster as claimed in claim 3, wherein the synchronization connection is configured as a communication channel with Layer-2 Ethernet frames and is made via the bus system.

6. The controller cluster as claimed in claim 2, wherein the synchronization connection is configured as a dedicated redundant line.

7. The controller cluster as claimed in claim 2, wherein the synchronization connection is configured as a communication channel with Layer-2 Ethernet frames and is made via the bus system.

8. The controller cluster as claimed in claim 1, wherein the first and second protocol stacks each includes a standard interface for data traffic from standard applications and a cluster interface for data traffic from cluster applications in each case.

9. The controller cluster as claimed in claim 8, wherein the first and second protocol stacks have a routing manager, which is configured to route data traffic from standard applications via the standard interface and to route data traffic from cluster applications via the cluster interface.

10. The controller cluster as claimed in claim 9, wherein the first and second protocol stacks includes a cluster services programming interface and a standard services programming interface.

11. The controller cluster as claimed in claim 8, wherein the first and second protocol stacks includes a cluster services programming interface and a standard services programming interface.

12. The controller cluster as claimed in claim 1, wherein the controller cluster comprises a high-availability, redundant automation system for automation applications for which an availability of an automation device is of highest priority, said controller cluster being configured for access by a client to be shown as a single system.

13. The controller cluster as claimed in claim 1, wherein the bus system includes a first bus segment, a second bus segment and a third bus segment;
wherein the first automation device is connected via a first switch to a first port on the first bus segment and to a second port on the second bus segment and the second automation device is connected via a second switch to a first port on the second bus segment and to a second port on the third bus segment; and
wherein the first switch includes a switch FDB which influenced to forwarding the data traffic for the cluster hardware address to the second switch.

14. A method for operating a controller cluster for controlling a technical device, a first automation device and a second automation device being operated redundantly on a bus system, a first control program executing on the first automation device and a second control program executing on the second automation device to control thee technical device, the first and the second control programs being formed such that said first and second control programs each perform the same control tasks for the technical device, and the first automation device being operated via a first network interface controller with a first standard hardware address on the bus system and the second automation device being operated via a second network interface controller with a second standard hardware address on the bus system, the method comprising:
operating a first virtual network interface controller between the first network interface controller and a first protocol stack of the first automation device;
operating a second virtual network interface controller between the second network interface controller and a second protocol stack of the second automation device;
operating the first and second network interface controllers with a cluster hardware address on the bus system;
accessing the first protocol stack via the first standard hardware address, the first protocol stack only being accessible via the first virtual network interface controller via the cluster hardware address when said controller is switched to active; and
accessing the second protocol stack via the second standard hardware address, the second protocol stack only being accessible via the second virtual network interface controller via the cluster hardware address when said controller is switched to active.

15. The method as claimed in claim 14, further comprising:
operating a first redundancy manager in the first automation device; and
operating a second redundancy manager in the second automation device;
wherein the first and second redundancy managers are interconnected via a synchronization connection and are configured to switch the first virtual network interface controller to active and to switch the second virtual network interface controller to inactive or switch the second virtual network interface controller to active and to switch the first virtual network interface controller.

16. The method as claimed in claim 15, wherein the first and second redundancy managers supervise functions on their respective first and second automation devices or on the functions executing therein and, when a malfunction is recognized on an automation device, switch the active virtual network interface controller to inactive and switch a corresponding inactive virtual network interface controller of another automation device to active.

17. The method as claimed in claim 16, wherein the synchronization connection is operated as a communication channel with Layer-2 Ethernet frames and is set up via the bus system and the network interface controllers.

18. The method as claimed in claim 15, wherein the synchronization connection is operated as a communication channel with Layer-2 Ethernet frames and is set up via the bus system and the network interface controllers.

19. The method as claimed in claim 14, wherein the first and second protocol stacks are each operated with a standard interface for data traffic from standard applications and with a cluster interface for data traffic from cluster applications, outgoing data traffic being accordingly routed via the corresponding interface; and     wherein data traffic from cluster applications is either blocked or forwarded depending on a status of the virtual network interface controller, data traffic from standard applications always being sent independently thereof, an appropriate application of the corresponding standard hardware address additionally being provided.

\* \* \* \* \*